United States Patent Office 3,434,029
Patented Mar. 18, 1969

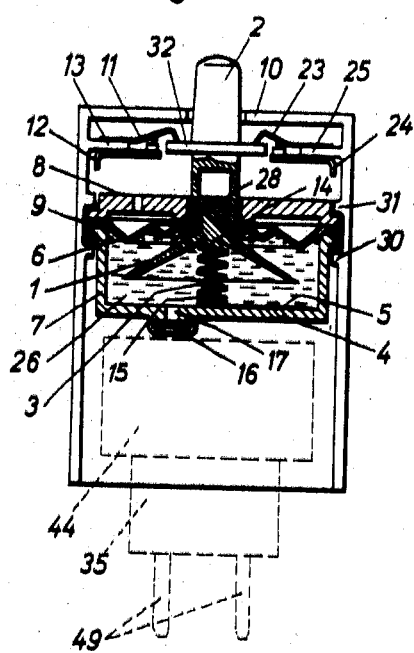
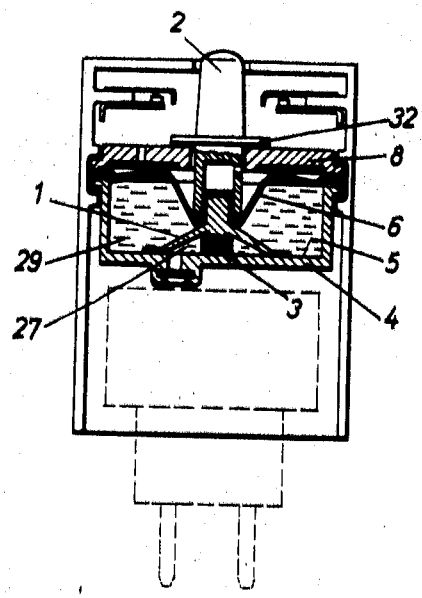
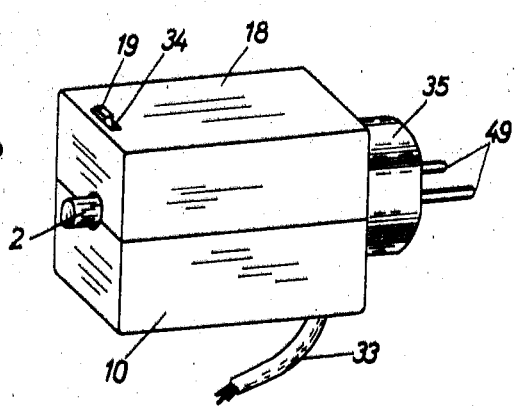

3,434,029
DEVICE FOR RECHARGING POWER CELLS AND REACTIVATING ELECTROLYTIC CAPACITORS
Karl Ackermann, Berlin, Germany, assignor to Robert Bosch Elektronik GmbH, Berlin, Germany
Filed Jan. 26, 1965, Ser. No. 428,151
Claims priority, application Germany, Mar. 31, 1964, B 76,130
U.S. Cl. 320—1      16 Claims
Int. Cl. H02j 7/04; H01g 9/00; F01b 19/00

ABSTRACT OF THE DISCLOSURE

An arrangement for applying a rejuvenating charge to a primary cell, and a reactivating voltage to an electrolytic capacitor. A switching circuit connects, when actuated, a low voltage D.C. source to the primary cell, and a high voltage D.C. source to the electrolytic capacitor. After a predetermined time interval, less than one hour, the switching circuit automatically disconnects the D.C. voltage sources from the primary cell and the capacitor. The switching circuit is timed so that the voltage applied to the primary cell does not result in the destruction of the cell due to overcharging. At the same time, a voltage applied to the capacitor prevails only for a period of time necessary to reactivate the capacitor.

---

The present invention relates to a device for rejuvenating primary cells, or dry cells, which operate electrical or electronic apparatus, for instance such as flashlights.

It is known that primary cells can be rejuvenated repeatedly, especially in cases in which the cells are normally called upon to deliver a relatively low current, but in which a current several times as large is required at various times, as for example in an electronic flash unit.

Primary cells are to be distinguished from secondary cells, such as acid-type storage batteries which can be recharged as often as is desired; such recharging of secondary cells is different from rejuvenation of primary cells, and it is the latter, namely, the rejuvenation of primary cells, with which this invention is concerned.

It is, however, a prerequisite for a successful rejuvenation operation that such operation last not longer than just under an hour. If the rejuvenation period were to be longer, the cell would undergo a permanent change which would render it inoperable.

It would be very inconvenient, in attempting to avoid exceeding the predetermined rejuvenation period, to require the user to constantly observe a clock, so that the operation may be stopped manually on time. There is also the additional inconvenience that the observer has to remain at the place where the rejuvenator is located, or return there after the proper time period.

The luminous energy of an electronic flash device is produced by the discharge, across a flash tube, of a storage condenser which has been charged to a high voltage, in the range of several hundred volts. This storage condenser is charged, before discharging, by means of a direct current converter containing a high voltage rectifier, which converter is driven by the primary cells. Because of the high capacity which is required of the storage condenser, electrolytic condensers are utilized. This type of condenser first has to be activated for a certain period of time if it has not been used for an interval of, for example, several weeks, before it will accept a charge large enough to provide the required high voltage within a sufficiently short time. This reactivation is easily accomplished by connecting a high voltage across the electrolytic condenser for a short period of time. After reactivation has been accomplished in this manner, the electrolytic condenser is ready for operation for several days.

There is no danger, in general, that any electrical components of the flash device could be damaged if the period of time required for reactivating the electrolytic condenser were exceeded. It can happen, however, that in a device which has been left on overnight, the increase in the line voltage which usually occurs during those hours leads to disruptive voltage discharges due to breakdown in the electrolytic condenser. The actual time required for reactivating the condenser is about equal to the time for rejuvenating the primary cells, that is, just short of an hour.

It is therefore an object of the present invention to provide a unit for automatically rejuvenating primary cells which eliminates the above-mentioned drawbacks.

It is a further object of the present invention to provide a unit for automatically rejuvenating primary cells in an electronic flash device, which unit also automatically reactivates the electrolytic condenser of the device.

In order to achieve these objects, as well as others, a unit is provided which may be built into the apparatus containing the cell to be rejuvenated, or may be physically separate from and electrically connectible with it, which unit contains a source of direct current and a time delay switching device. This switching device, when actuated, connects the D.C. source with the primary cells, and shuts off by itself after a predetermined period of time required for rejuvenation.

At the time the batteries are discharged to the point where rejuvenation seems necessary, the only thing one has to do is actuate the switching device of the attachment unit, which can then be left completely unattended. After the predetermined period is over, the switching device will shut off by itself.

According to a further feature of the invention, the D.C. source can be a line transformer with a low-voltage rectifier connected at the secondary winding side, of a few volts.

The unit can then be simultaneously used to apply an alternating voltage derived from the line transformer to the storage condenser, via the high-voltage rectifier in the electronic flash device, for the predetermined period of time, so that the storage condenser can be activated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIGURE 1 shows, in longitudinal section through the attachment, a time switch constructed according to the present invention; the switch is in the off condition.

FIGURE 2 is a view similar to that of FIGURE 1, in which the time switch is turned on.

FIGURE 3 is a perspective view of the assembled device.

Figure 4:
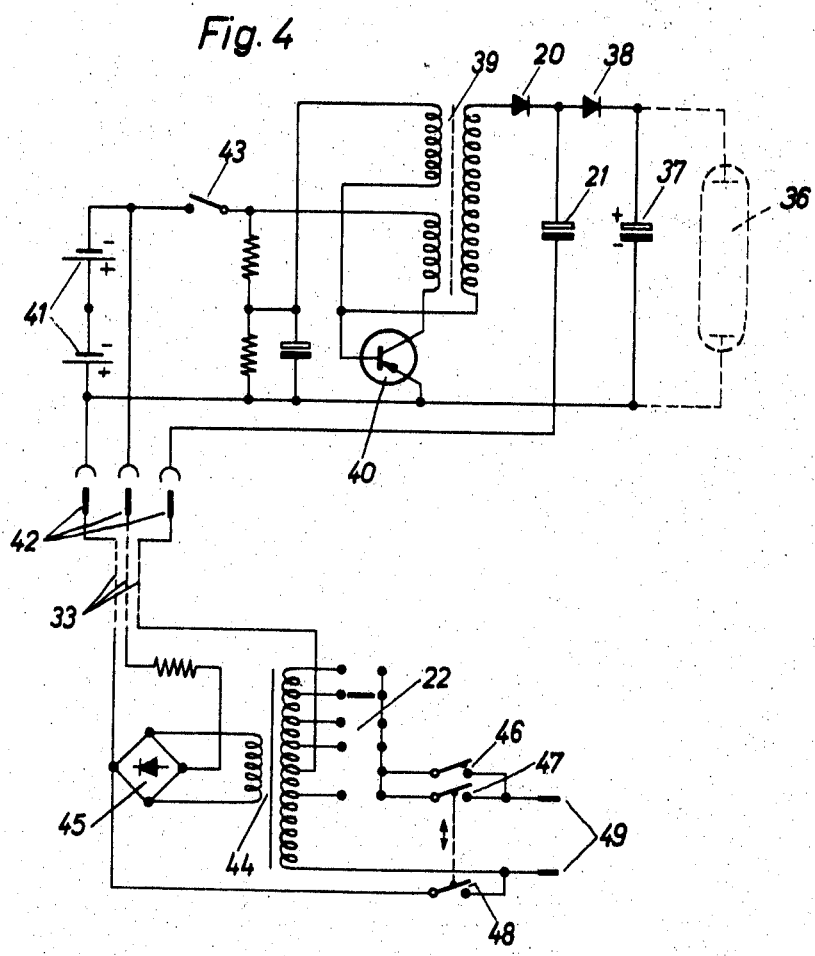
FIGURE 4 is a schematic circuit diagram showing, in principle, an electronic flash device and an attachment according to the invention for regenerating its primary cells.

As shown in the figures, a conical membrane 1 of elastic material can be moved longitudinally by means of a plunger 2 fastened to the apex of the cone on the outside thereof. The plunger is guided in the upper end wall 8. In the turned-off condition corresponding to FIGURE 1, two sets of contacts are opened; in the completely turned-on condition corresponding to FIGURE 2, these contact sets are closed.

The contact sets include a contact spring 11 and a contact bar 12, for example for switching on the rejuvenation voltage, as well as a contact spring 23 and a contact bar 24, for example, for switching on the reactivating voltage. The sets of contacts are mounted on two projections 13, 25, of a housing enclosing the time switch, which housing is substantially square in profile and is formed of two half-shells 10, 18, which can for example, be screwed together. The half-shells may, for example, be injection-molded of plastic.

The time delay unit is in a box-like container having an elastic, corrugated partition 6 on the inside, below its upper end wall 8. This partition is impermeable to the fluid used and is fixedly positioned within the container between the upper rim of side wall 7 of the container, which side wall completely encircles the partition, and the lower rim of the upper cover-like end wall 8, which is pressed onto the elastic partition 6 and the side wall 7 by means of a bracket 9 of metal extending completely around the container.

The container housing the time switch is rigidly mounted within the half-shells 10, 18 of the housing by two beadings 30, 31, provided at corresponding places on the inner wall of the housing, which receive the bracket 9 between them.

The elastic partition 6 serves to close off a chamber 26 in the larger, lower portion of the container. This chamber is formed (aside from the elastic partition 6) by the side wall 7 of the container, which extends completely around the latter, and by the wall 4 which forms the bottom of the box-like container. The elastic partition has, in its center, a pot-shaped bulge directed upwardly, the outer circumference of which fits flush into a cavity in the lower face of the plunger 2. A cylindrical extension 28 of the membrane is inserted up into this inverted pot-shaped bulge. Thus, plunger 2, the elastic partition 6, and the conical membrane 1 are rigidly connected with one another.

A coil spring 3 presses the conical membrane 1 upwardly. This spring abuts the wall 4 of the container, and is held in its central position by a downwardly pointing tongue 14 on the conical membrane, as well as by pin 15, extending upwardly from wall 4.

If finger pressure is exerted upon the plunger 2, the upper free end of which is fashioned as a push-button, the conical membrane 1 is moved downwardly against the force of spring 3 from its rest position, in which its rim is substantially spaced from wall 4, to a position in which the rim contacts wall 4. As plunger 2 is depressed further, a portion of the volume of fluid which has beneath the membrane when it touched wall 4 is forced into the chamber 29, beyond the membrane; this fluid flows out between the rim of the elastic membrane and wall 4.

When a collar 32, which extends around the plunger 2, abuts the upper end plate 8, the plunger is fully depressed, and the conical membrane 1 stops its downward motion and assumes the position and shape depicted in FIGURE 2. However, while the liquid which was underneath the cone-shaped membrane could flow out between the rim and wall 4 during the downward movement of the plunger, because of the elasticity of the membrane, the liquid can not flow back readily, because the rim of the membrane contacts wall 4 such that it forms a complete seal. For this reason, the compressed coil-shaped spring 3 can not force the membrane upwardly after the finger has been lifted off the plunger; this would create a vacuum beneath the membrane.

The elastic partition 6 which, in the switched-off condition of the time switch, has the shape illustrated in FIGURE 1, is deformed, in the switched-on condition of FIGURE 2, in such a manner that in both conditions the same quantity of fluid is contained beneath the partition. This takes into consideration the amount of liquid freely movable beneath the cone-shaped membrane 1 (see FIGURE 1) as well as the amount of liquid enclosed in space 27 (see FIGURE 2).

In order to allow the fluid to flow back into the space 27 beneath the conical membrane 1 of FIGURE 2 within a predetermined period of time, a narrow-gauge wire 5 is attached radially with respect to the conical membrane, between the rim of the latter and wall 4. This wire creates two equalizing channels along its sides, which form openings between the rim of the membrane and wall 4. Through these channels (the cross section of which can easily be varied by suitably selecting the gauge of the wire) fluid can now flow back from chamber 29 into space 27, under the suction created as the conical membrane 1 is moved upwardly by the compressed coil spring 3.

The time delay between the instant when the plunger is released and the instant at which the rim of the cone-shaped membrane 1 separates from wall 4 depends upon the gauge of the wire 5, upon the viscosity of the liquid, and to a minor degree upon the restoring force of spring 3.

After the rim of the cone-shaped membrane 1 is lifted off the wall 4, the plunger moves rapidly ahead under the force of spring 3 and suddenly separates, by means of the collar 32 extending around the plunger, the contact springs 11, 23, from the contact bars 12, 24, thus terminating the rejuvenation and/or reactivation operation which had been initiated by pressing the plunger 2.

The liquid may be poured into the chamber 26 through a hole 17 provided in wall 4, after the time switch has been assembled; this hole is then sealed off by means of a cover plate 16.

If air is used as the fluid in place of liquid, it is not necessary to provide elastic partition 6; however, correspondingly smaller delay times are obtained.

In the case of an electronic flash device having a circuit such as that shown in principle in the upper half of FIGURE 4, when operating switch 43 is closed, the current of two primary cells 41 is periodically interuupted by a transistor 40 (which is self-oscillating) connected across windings of a transformer 39. The alternating voltage produced across the transistor is transformed to a higher voltage by a further winding of the transformer 39, is rectified by two series-connected high-voltage rectifiers 20, 38, and the D.C. current so produced is finally used, to charge an electrolytic storage condenser 37 to a high voltage. By means which are not shown, the storage condenser is ultimately discharged across a flash discharge tube 36, to produce a flash.

If the two batteries 41 are to be rejuvenated, the attachment unit (the circuit diagram of which is shown in principle in the lower half of FIGURE 4) is connected with the flash device by means of a three-pronged plug 42. Two plug prongs 49 of a two-prong standard line plug 35 of the attachment are inserted in a line socket, and the plunger of the time switch built into the unit is depressed. Only contact sets 46, 47, 48, of this time swtich are illustrated in FIGURE 4. The set of contacts 47 for rejuvenating the batteries 41 includes contact spring 11 and contact bar 12 of FIGURE 1, while the set of contacts 48 for reactivating the storage condenser 37 includes contact spring 23 and contact bar 24.

Via contact set 47, which is closed by depressing the plunger, the primary winding 44a of a line transformer 44 is connected to line voltage, while the secondary winding 44b supplies, via a low-voltage rectifier 45, direct current for rejuvenating batteries 41. The rejuvenating operation is terminated when the plunger of the time switch jumps back.

A selector switch 22 serves for adjusting the line transformer 44 to compensate for varying line voltage; this is accomplished by moving contact bar 22a.

When the plunger is depressed, the set of contacts 48 is closed simultaneously with the contact set 47, and thus a circuit for reactivating the storage condenser 37 is closed.

This circuit applies voltage to the positive terminal of the storage condenser 37, via the upper plug prong 49, the closed contact set 47, the selector switch 22, the primary winding of the line transformer 44, the right-hand plug prong of the three-pole plug 42, the condenser 21, and the rectifier 38; the negative terminal of the storage condenser 37 is connected through the left-hand plug prong of the three-pole plug 42, the closed contact set 48, and the lower plug prong 49. A rectifier 20 acts as a voltage doubler in conjunction with the rectifier 38 and condenser 21, if the alternating voltage is applied via the latter.

If, in place of primary cells 41, which in this case are batteries, chargeable accumulators are used, and if these require charging for a longer period of time (for example, several hours) contact set 46 (FIGURE 4) can be manually short-circuited by means of lever 19 (shown in FIGURE 3) which is slidable within a slot 34 in the upper half-shell 18. This allows the primary winding of the line transformer 44 to remain energized even after the plunger has jumped back, and contact set 47 has been thereby opened. Thus, the charging voltage for the accumulators, which is rectified by the low-voltage rectifier 45, remains on as long as the plug prongs 49 remain plugged in. The reactivation of the storage condenser 37 is terminated in any case when the plunger jumps back.

According to FIGURE 3, the lever 19 for switching the contact 46 projects from the large wall of the upper half-shell 18. A cable 33 leaves the housing from the large wall of the lower half-shell 10, which cable carries the three-pole plug 42, insertable into the flash device. The two-prong line plug 35 is mounted on the right-hand side of the housing 10, 18.

It will be seen from the preceding discussion that in one embodiment of the invention, the switching devices may contain a time-control unit of known construction, which is conventionally used for many purposes and in widely varying structures. However, this is very expensive, particularly considering the relatively long period of delay which is required in the present case.

Therefore, in an especially suitable embodiment of the invention, described above, the switching device contains a time-control unit, the delay time of which is determined by a gaseous or liquid medium flowing through an orifice. The time switch can be constructed using a membrane of elastic material, for example, rubber or an elastic synthetic, which membrane is shaped like an open cone, the apex of which is fastened on the outside to a longitudinally movable plunger. The open side of the conical membrane can be placed against a wall and the membrane pressed, by means of the plunger, against the force of a spring, against the wall so that its shape is flattened and its edge forms a seal against the wall. All this takes place in surroundings which are filled by a gaseous or liquid medium. An opening in the wall or in the membrane is provided, the cross section of which corresponds to the length of the predetermined time period desired, through which the medium is allowed to flow.

The conical membrane can be moved longitudinally by means of the guided plunger. As it is moved toward the wall, its periphery contacts the wall and it is spread flat, the volume of the medium enclosed between the membrane and the wall decreasing as the medium is forced into the space beyond the membrane. Because of the elasticity of the membrane, its rim is lifted slightly off the wall. While the spring force acting against this movement of the plunger can be relatively easily overcome by finger pressure, so that within a short period of time the medium enclosed between the membrane and the wall can be forced out, the automatic movement of the plunger in the opposite direction, after finger pressure is released, which movement is caused by the action of the spring returning the membrane to its original form, takes place only very slowly. This slow return movement, which provides the delay time, is determined by the flow velocity of the medium, which can only flow back through the above-mentioned opening, which has a small cross section, provided in the wall or in the membrane. To achieve constant delay time, the membrane rim and the wall must form a tight seal.

According to a further embodiment of the invention, as will be seen from the above discussion, the time switch may be enclosed in a box-like housing, one wall of which carries the guide for the plunger, while the opposite wall is that against which the membrane is forced. A coil spring can be loosely inserted in the housing without the use of a special mounting element.

The orifice for the medium which flows therethrough can be provided in the wall against which conical membrane is spread, or it can be provided in the membrane, for instance, at its upper end. The opening can also be provided between the rim of the membrane and the wall against which the membrane is spread. This can be done, for example, by providing the rim of the membrane and/or the surface of the wall with a predetermined roughness. It is also possible to provide a small groove in the wall or a cutout in the rim of the cone-shaped membrane.

Suitably, the opening can be created by interposing a correspondingly thin wire between the rim of the cone-shaped membrane and that wall against which the cone-shaped membrane is spread. Thereby, two hollow spaces are formed in a simple manner which extend along the wire and form the opening. The cross section of these hollow spaces depends particularly on the gauge of the wire. It has been found that if the opening is in the form of this embodiment, a time delay is achievable which is uniform in a satisfactory manner.

If ambient air is used for the medium, the air beneath the cone-shaped membrane is forced to the outside, i.e., into the space beyond the membrane, when the plunger is moved toward the wall; upon movement of the plunger in the opposite direction, caused by the spring, the air flows back out of the space beyond the membrane through the opening.

In accordance with a further feature of the invention, in order to obtain a sufficiently long delay time even if the dimensions of the time switch are relatively small, a liquid medium can be used. If a liquid is used as the medium, this liquid must not be permitted to escape from the space beyond the conical membrane; this is accomplinhed by providing a closed-off chamber in the switch housing, which chamber includes an elastic partition impermeable to the liquid. The reason why this partition should be made of elastic material has been explained above. Glycerin has proven to be a particularly suitable liquid medium.

As has been shown, in order to trigger the switching operations for rejuvenating the cells and for reactivating the storage condenser, the plunger of the time switch may be shaped at its free end as a push-button. Contact springs which can be switched over by the plunger can be provided for opening and closing circuits for rejuvenating the primary cells and for reactivating the storage condenser.

Downward movement of the plunger causes the contact springs to close and the coil spring to be tensioned, as the cone-shaped membrane is spread apart. Upon being released, the plunger moves automatically upward, relieving the tension on the spring. This takes place within a period of time which predetermined by the flow velocity of the medium through the orifice. Shortly before the plunger reaches its starting position, the contacts are again opened by the plunger in the course of its upward movement.

It is, of course, also possible to utilize the time switch for other purposes than for the regeneration of batteries (primary cells) of electronic flash devices and for reactivating their storage condensers, such as, for example, for regenerating batteries of electric shavers, transistorized radio receiver, and the like.

The attachment can either be built as an integral unit with the electric or electronic device, or, as demonstrated in the drawings, it can be can be an independent unit connectible with the device.

It will be understood that each of the elements described above, or two or more together, may also find a useful application in other types of circuitry differing from the types described above.

While the invention has been illustrated and described as embodied in an electronic flash unit, it is not intended to be limited to the details shown, since various modifications and structural changes may be made without departing in any way from the spirit of the present invention.

What is claimed as new and desired to be secured by Letters Patent is:

1. A unit for rejuvenating primary cells which energize an electrical device, such as an electronic flash device, said unit comprising, in combination:

a source of D.C. power, said D.C. source including a line transformer having primary and secondary windings, and a low-voltage rectifier connected to the secondary winding;

switching means for connecting said D.C. source to rejuvenate said primary cell, when actuated, and for automatically disconnecting said source from the primary cell after a predetermined period of time, so that the rejuvenating operation is limited in time and will not destroy the primary cell, said electronic flash device including a D.C. voltage converter driven by said primary cell and charging an electrolytic storage condenser via a high-voltage rectifier, which storage condenser supplies power to a flash discharge tube, wherein:

said switching means includes means connected to said line transformer for applying an alternating voltage to such high-voltage rectifier during said predetermined period of time, whereby a reactivating voltage is applied to the electrolytic storage condenser for said time period.

2. A unit as defined in claim 1 wherein said switching means includes a time delay unit, the delay time of which is determined by a fluid medium flowing through an orifice.

3. A unit as defined in claim 2, wherein said time delay unit includes:

means forming a conical elastic membrane having an apex and a rim at an open base end;

means forming a first wall spaced from and substantially parallel to the plane of said rim;

longitudinally movable plunger means fastened to said apex for moving said membrane toward said wall, so that the conical membrane and the wall together form a first sealed chamber filled with and surrounded by said fluid medium;

spring means for pushing said conical membrane longitudinally away from the wall; and means forming an orifice, the cross section of which corresponds to said predetermined time period, in a wall of said first sealed chamber through which said medium can flow.

4. A unit as defined in claim 3, wherein said membrane is made of rubber.

5. A unit as defined in claim 3, wherein said membrane is made of an elastic synthetic material.

6. A unit as defined in claim 3, wherein said time delay unit includes means forming a box-like container, and means provided at a wall of said container opposite said first wall for guiding said longitudinally movable plunger.

7. A unit as defined in claim 6 wherein said orifice is provided in the first wall.

8. A unit as defined in claim 6 wherein said orifice is provided at the intersection of the rim of the conical membrane and said first wall.

9. A unit as defined in claim 8, including a length of narrow-gauge wire between the rim of said conical membrane and the first wall for holding the latter two means apart to form said orifice.

10. A unit as defined in claim 9, wherein said fluid is a liquid, and including means forming a second sealed chamber in communication with and surrounding said first sealed chamber, said second sealed chamber including said first wall means forming side walls extending from the first wall, and an elastic partition impermeable to said liquid attached to the side wall means opposite the first wall to complete said second sealed chamber.

11. A unit as defined in claim 3, wherein the free end of said plunger means forms a push-button, and said switching means include first and second contact springs actuatable by said plunger for connecting the D.C. source to rejuvenate the primary cell and connecting the means for applying an alternating voltage to such high-voltage rectifier, respectively, and for disconnecting them.

12. A time delay unit comprising, in combination:

means forming a conical elastic membrane having an apex and a rim at an open base end;

means forming a first wall spaced from and substantially parallel to the plane of said rim;

longitudinally movable plunger means fastened to said apex for moving said membrane toward said wall so that the conical membrane and the wall together form a first sealed chamber filled with and surrounded by a fluid medium;

spring means for pushing said conical membrane longitudinally away from the wall; and means forming an orifice, the cross section of which corresponds to a predetermined time period, in a wall of said first sealed chamber through which said medium can flow.

13. A time delay unit as defined in claim 12, wherein said fluid is a liquid, and including means forming a second sealed chamber in communication with and surrounding said first sealed chamber, said second sealed chamber including said first wall, means forming side walls extending from the first wall, and an elastic partition impermeable to said liquid attached to the side wall means opposite the first wall to complete said second sealed chamber.

14. A time delay unit as defined in claim 13, including a length of narrow-gauge wire between said rim and said first wall for holding the latter two means apart to form said orifice.

15. An arrangement for rejuvenating a primary cell and reactivating an electrolytic capacitor comprising, in combination, a source of D.C. power with low-voltage D.C. output terminal means for charging said primary cell and with high-voltage D.C. output terminal means for reactivating said electrolytic capacitor; and switching means connecting, when actuated, said low-voltage D.C. output to said primary cell and said high-voltage output to said capacitor, said switching means disconnecting automatically said low-voltage D.C. output from said primary cell and said high-voltage output from said capacitor after a predetermined time interval whereby said primary cell receives a rejuvenating charge during said predetermined time interval and said capacitor receives a reactivating voltage during said time interval.

16. An arrangement for rejuvenating a primary cell and reactivating an electrolytic capacitor comprising, in combination, transformer means having primary and secondary windings; first rectifying means connected to said secondary winding for providing a low-voltage D.C. source for charging and rejuvenating said primary cell; second rectifying means connected to said transformer means for providing a high voltage D.C. source to charge said electrolytic capacitor with a reactivating voltage; and switching means connecting, when actuated, said low-voltage D.C. source to said primary cell and said high-voltage D.C. source to said capacitor, said switching means disconnecting automatically said low-voltage D.C. source from said primary cell and said high-voltage D.C.

source from said capacitor after a predetermined time interval whereby said primary cell receives a rejuvenating charge during said predetermined time interval and said capacitor receives a reactivating voltage during said time interval.

References Cited

UNITED STATES PATENTS 2,987,663  6/1961  Medlar _____ 320—38

BERNARD KONICK, *Primary Examiner.*

JOSEPH F. BREIMAYER, *Assistant Examiner.*

U.S. Cl. X.R.

92—40, 94; 317—231; 320—38